(12) United States Patent
Bhaumik et al.

(10) Patent No.: US 9,436,544 B2
(45) Date of Patent: Sep. 6, 2016

(54) METHODS FOR IMPLEMENTING ERROR DETECTION AND RECOVERY AND DEVICES THEREOF

(71) Applicant: Wipro Limited, Bangalore (IN)

(72) Inventors: Soham Bhaumik, Bangalore (IN); Hemant Kumar, Mayur Vihar Phase (IN); Amit Krishna, Bangalore (IN); Nithya Ramkumar, Bangalore (IN); Sridhar Krishnaswamy, Bangalore (IN)

(73) Assignee: Wipro Limited, Bangalore (IN)

( * ) Notice: Subject to any disclaimer, the term of this patent is extended or adjusted under 35 U.S.C. 154(b) by 178 days.

(21) Appl. No.: 14/462,728

(22) Filed: Aug. 19, 2014

(65) Prior Publication Data

US 2015/0378809 A1  Dec. 31, 2015

(30) Foreign Application Priority Data

Jun. 26, 2014  (IN) ............................ 3123/CHE/2014

(51) Int. Cl.
  *G06F 11/00* (2006.01)
  *G06F 11/07* (2006.01)
  *G06Q 10/00* (2012.01)

(52) U.S. Cl.
  CPC ....... *G06F 11/0793* (2013.01); *G06F 11/0709* (2013.01); *G06Q 10/00* (2013.01)

(58) Field of Classification Search
  CPC ........... G06F 11/0709; G06F 11/0712; G06F 11/079; G06F 11/0793
  See application file for complete search history.

(56) References Cited

U.S. PATENT DOCUMENTS

| | | | |
|---|---|---|---|
| 6,898,733 B2 | 5/2005 | Parks et al. | |
| 7,401,256 B2 | 7/2008 | Ishida | |
| 7,539,746 B2 | 5/2009 | Bankier et al. | |
| 8,060,792 B2* | 11/2011 | Sivasubramanian | G06F 9/5061 714/47.1 |
| 9,218,246 B2* | 12/2015 | Nagesharao | G06F 11/1415 |
| 2004/0068501 A1 | 4/2004 | McGoveran | |
| 2011/0029810 A1* | 2/2011 | Jaisinghani | H04L 41/12 714/4.1 |
| 2011/0078499 A1 | 3/2011 | Fong et al. | |
| 2013/0042139 A1* | 2/2013 | Bhalerao | G06F 11/0793 714/2 |
| 2013/0166963 A1 | 6/2013 | Stoyanov | |
| 2013/0227335 A1* | 8/2013 | Dake | G06F 11/0709 714/4.2 |
| 2013/0227355 A1* | 8/2013 | Dake | G06F 11/0709 714/48 |
| 2015/0212901 A1* | 7/2015 | Aggarwal | G06F 11/0793 714/15 |

* cited by examiner

*Primary Examiner* — Joseph Kudirka
(74) *Attorney, Agent, or Firm* — LeClairRyan, a Professional Corporation

(57) ABSTRACT

A method, device and non-transitory computer readable medium that implements error detection and recovery includes receiving from one or more agents monitoring one or more subsystem processes of a business process operating in a cloud based architecture an identification of an error condition in at least one of the subsystem processes. Additionally, any associated information or data necessary to execute the at least one of the subsystem processes with the identified error condition is received. An error recovery process for the at least one of the subsystem processes with the identified error condition is executed by the application management computing device. The recovered at least one of the subsystem processes with the identified error condition is reinitiated using the received information or data corresponding to the at least one of the subsystem processes with the identified error condition.

18 Claims, 3 Drawing Sheets

METHODS FOR IMPLEMENTING ERROR DETECTION AND RECOVERY AND DEVICES THEREOF

This application claims the benefit of Indian Patent Application No. 3123/CHE/2014 filed Jun. 26, 2014, which is hereby incorporated by reference in its entirety.

FIELD

This technology generally relates to methods and devices for error detection and recovery and, more particularly, to methods for implementing error detection and recovery for a business process operating in a cloud based architecture.

BACKGROUND

Typically, business process management systems are built on a monolithic architecture that has constraints at the application level. At the application level there may be cases where the provision for error recovery may be very limited or do not exist.

By way of example, in a scenario where a functionality instance has to send an e-mail to complete a business process, but the email sending mechanism fails due to a fault, such as a network error or system error, the activity flow of the business process is interrupted or stopped until the e-mail functionality is resolved. In this type of example, typically the error recovery process would be done manually with help of human interaction using another system or through updates. Unfortunately, this would add significant time delays on the completion of the business process.

SUMMARY

A method for implementing error detection and recovery includes receiving, by the application management computing device, from one or more agents monitoring one or more subsystem processes of a business process operating in a cloud based architecture an identification of an error condition in at least one of the subsystem processes. Additionally, any associated information or data necessary to execute the at least one of the subsystem processes with the identified error condition is received by the application management computing device. An error recovery process for the at least one of the subsystem processes with the identified error condition is executed by the application management computing device. The recovered at least one of the subsystem processes with the identified error condition is reinitiated, by the application management computing device, using the received information or data corresponding to the at least one of the subsystem processes with the identified error condition.

An application management computing device includes a processor coupled to a memory and configured to be capable of executing programmed instructions stored in the memory includes receiving from one or more agents monitoring one or more subsystem processes of a business process operating in a cloud based architecture an identification of an error condition in at least one of the subsystem processes. Additionally, any associated information or data necessary to execute the at least one of the subsystem processes with the identified error condition is received. An error recovery process for the at least one of the subsystem processes with the identified error condition is executed by the application management computing device. The recovered at least one of the subsystem processes with the identified error condition is reinitiated using the received information or data corresponding to the at least one of the subsystem processes with the identified error condition.

A non-transitory computer readable medium having stored thereon instructions for implementing error detection and recovery comprising machine executable code which when executed by a processor, causes the processor to perform steps including receiving from one or more agents monitoring one or more subsystem processes of a business process operating in a cloud based architecture an identification of an error condition in at least one of the subsystem processes. Additionally, any associated information or data necessary to execute the at least one of the subsystem processes with the identified error condition is received. An error recovery process for the at least one of the subsystem processes with the identified error condition is executed by the application management computing device. The recovered at least one of the subsystem processes with the identified error condition is reinitiated using the received information or data corresponding to the at least one of the subsystem processes with the identified error condition.

This technology provides a number of advantages including providing methods, devices, and non-transitory computer readable media that efficiently and effectively implement error detection and recovery automatically for a business process operating in a cloud based architecture. With this technology, the time period for recovering and reinitiating a subsystem process is substantially reduced. Additionally, with this technology other subsystems processes are able to continue execution during the error recovery. Further, this technology is able to obtain and provide metrics about instances of the subsystem modules or processes during the life cycle of a business process and can make automatic adjustments related to error recovery.

DETAILED DESCRIPTION

Figure 1:
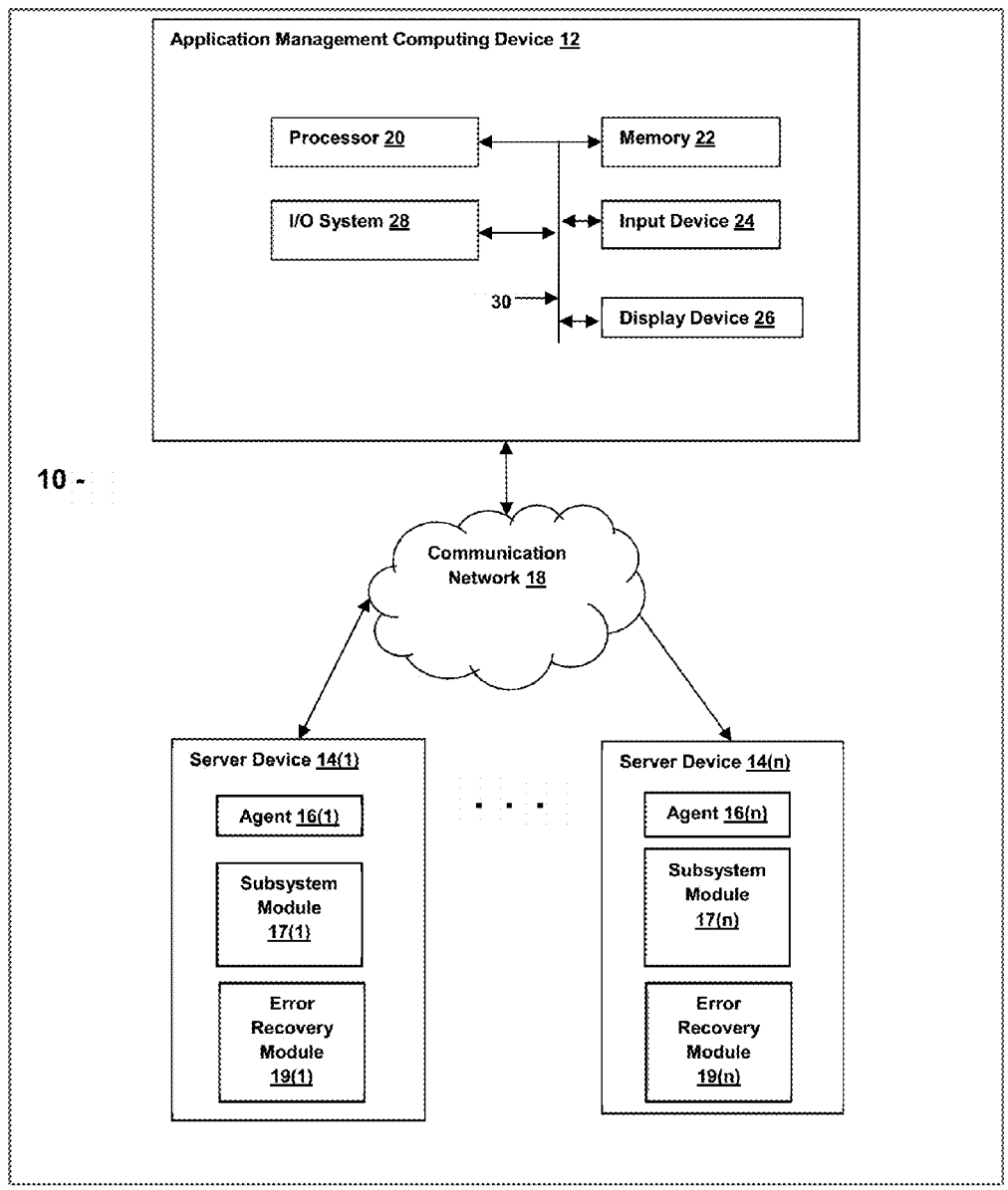
FIG. 1 is a diagram of an example of an environment with an application management computing device and server devices.
Figure 2:
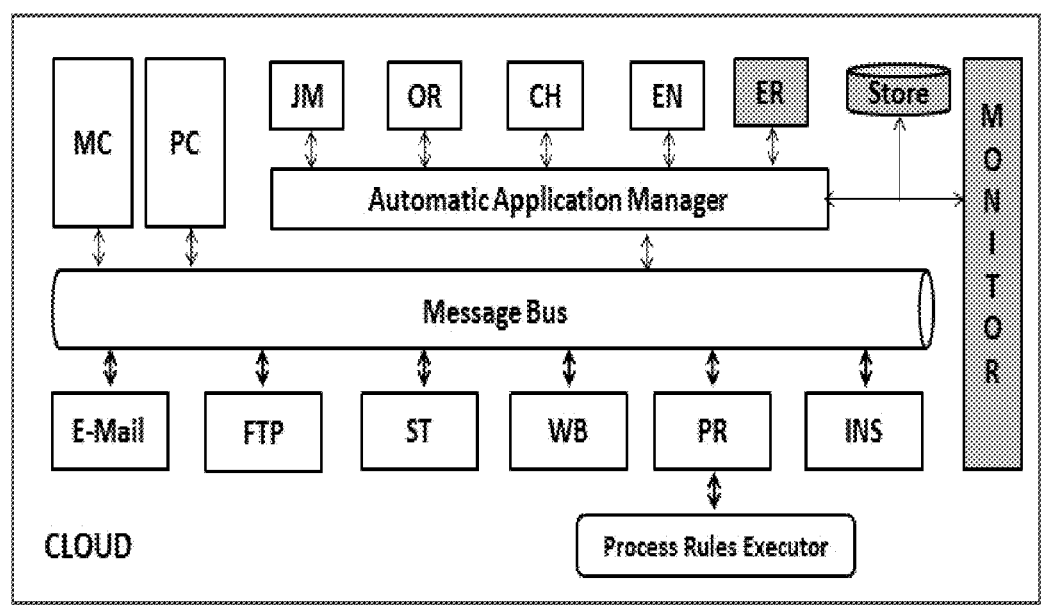
FIG. 2 is a functional block diagram of a portion of the environment shown in FIG. 1.

An example of an environment 10 with an application management computing device 12 is illustrated in FIGS. 1-2. In this particular example, the environment 10 includes the application management computing device 12 and server devices 14(1)-14(n) which acts as virtual machines and each with a corresponding one of the agents 16(1)-16(n), subsystem modules or processes 17(1)-17(n), and error recovery (ER) modules 19(1)-19(n), and a communication network 18, although the environment could include other types and/or numbers of other systems, device, components, and/ or other elements in other configurations. This technology provides methods, devices, and non-transitory computer readable media that efficiently and effectively implement error detection and recovery automatically for a business process operating in a cloud based architecture.

In this particular example, the application management computing device 12 includes a processor 20, a memory 22, user input device 24, display 26, and a input/output (I/O) system 28, which are coupled together by one or more buses or other links 30, although other numbers and types of systems, devices, components, and elements in other configurations and locations can be used. The processor 20 executes a program of stored instructions for one or more aspects of the present technology as described and illustrated by way of the examples herein, although other types and numbers of processing devices and logic could be used and the processor 20 could execute other types and/or numbers of programmed instructions.

The memory 22 in the application management computing device 12 stores these programmed instructions for one or more aspects of the present technology as described and illustrated herein, although some or all of the programmed instructions could be stored and/or executed elsewhere. A variety of different types of memory storage devices, such as a random access memory (RAM) and/or read only memory (ROM) in the application management computing device 12 or a floppy disk, hard disk, CD ROM, DVD ROM, or other computer readable medium which is read from and written to by a magnetic, optical, or other reading and writing system that is coupled to the processor 20, can be used for the memory 22.

Input device 24 enables a user, such as an administrator, to interact with the application management computing device 12, such as to input and/or view data and/or to configure, program and/or operate it by way of example only. By way of example only, input device 24 may include one or more of a touch screen, keyboard and/or a computer mouse.

The display device 26 enables a user, such as an administrator, to view and/or interact with the application management computing device 12, such as to view and/or input information and/or to configure, program and/or operate it by way of example only. By way of example only, the display device 26 may include one or more of a CRT, LED monitor, LCD monitor, or touch screen display technology although other types and/or numbers of display devices could be used.

The I/O system 28 of the application management computing device 12 operatively couples and facilitates communication with the one or more of the server devices 14(1)-14(n) and their corresponding agents 16(1)-16(n) via the communications network 18, although other types and numbers of communication networks or systems with other types and numbers of connections and configurations can be used. By way of example only, the one or more communication networks may use TCP/IP over Ethernet and industry-standard protocols, including NFS, CIFS, SOAP, XML, LDAP, and/or SNMP, although other types and numbers of communication networks, such as a direct connection, a local area network, a wide area network, each having their own communications protocols, can be used.

Each of the server devices 14(1)-14(n) include a processor, a memory, and an I/O system, which are coupled together by a bus or other link, although other numbers and types of devices and/or nodes as well as other network elements could be used. In this particular example, the server devices 14(1)-14(n) are virtual machines (VM) that provide the hardware infrastructure on which the subsystem modules or processes 17(1)-17(n) are set up and executed. Each of the server devices 14(1)-14(n) includes a corresponding one of the agents 16(1)-16(n), subsystem modules or processes 17(1)-17(n), and error recovery (ER) modules 19(1)-19(n), although each of the server devices could include other types and/or numbers of other systems, devices, components, and/or other elements.

The agents 16(1)-16(n) on each of the server devices 14(1)-14(n) perform a number of different types of functions and other operations as illustrated and described herein. For example, the set up and execution of the subsystem modules or processes 17(1)-17(n) are controlled by the agents 16(1)-16(n) on each of the server devices 14(1)-14(n). Additionally, the agents 16(1)-16(n) on each of the server devices 14(1)-14(n) are responsible for instantiating the instance of the subsystem modules or processes 17(1)-17(n) during a life cycle of a business proves by providing the required resources, such as memory and processing space by way of example only. The agents 16(1)-16(n) also are responsible for monitoring the execution of the subsystem modules or processes 17(1)-17(n) and related metrics, such as resource utilization related to RAM, CPU cycles, and/or middleware by way of example only, although the agents can monitor and store other types and/or amounts of information. Further, for error recovery the agents 16(1)-16(n) are responsible for providing event information related to the execution of the subsystem modules or processes 17(1)-17(n) to the corresponding one of the error recovery (ER) modules 19(1)-19(n).

The memory in each of the server devices 14(1)-14(n) may include one or more of the subsystem modules or processes 17(1)-17(n) comprising programmed instructions configured for execution on the corresponding server devices 14(1)-14(n) for virtual display on display device 26 and interaction with input device 26 on the application management computing device 12. By way of example only, the subsystem modules or processes 17(1)-17(n) or other sets of programmed instructions are illustrated in FIG. 2 and may include: Machine Configuration (MC); Process Configuration (PC); Job Management (JM); Orchestration (OR); Choreography (CH); Enactment (EN); E-Mail Gateway; File Transfer Protocol Gateway (FTP); Scheduler Gateway (ST); Process Rules Gateway (PR); Insight Gateway Server (NS); Work Bench Gateway (WB); Process Rules Executor; Message Bus; ER (Error Recovery); Automatic Application Manager; and Virtual Machine (VM), although other types and/or numbers of modules or other programmed instructions could be used.

In this particular example, the MC is one of the subsystem modules or processes 17(1)-17(n) responsible for setting up the required infrastructure or environment for the subsystem modules or processes 17(1)-17(n) to be hosted and executed. The PC is one of the subsystem modules or processes 17(1)-17(n) responsible for defining or modeling a business process into a subsystem executable component. The JM is one of the subsystem modules or processes 17(1)-17(n) that provides life cycle management of work items that are to be executed by human participants. Work items are created as a result of events generated by other ones of the subsystem processes 17 (1)-17(n). OR is one of the subsystem modules or processes 17(1)-17(n) that provides enterprise integration facilities with external systems, such as SAP, BAAN, Oracle, and/or Siebel by way of example only. The required integration may be a bi-directional request-response communication. CH is one of the subsystem modules or processes 17(1)-17(n) that offers a first level of interactions after receiving inputs from the gateways, such as the File Gateway, E-Mail Gateway, and/or FTP Gateway by way of example only. The CH also takes care of a life cycle of a business process with respect to instantiation, creation, deletion, and/or updating of the business process. Additionally, the CH manages inter business process communication between each of the subsystem modules or processes 17 (1)-17(n). The EN is one of the subsystem modules or processes 17(1)-17(n) that is the core subsystem module or process and back bone of all other of the subsystem modules or processes 17(1)-17(n) and also helps in communicating with other ones of the subsystem modules or processes 17(1)-17(n), such as CH, OR and/or JM by way of example one. The E-Mail Gateway is one of the subsystem modules or processes 17(1)-17(n) that helps in getting the messages in the form of emails. The FTP Gateway is one of the subsystem modules or processes 17(1)-17(n) that helps in getting the messages from different locations of server devices 14(1)-14(n), although it could assist other types and/or numbers of devices and other systems. The ST Gateway is one of the subsystem modules or processes 17(1)-17(n) used to trigger subsystem modules or processes 17(1)-17(n) for one or more of the agents 16(1)-16(n) to work on based on pre-configured timer. The PR Gateway is one of the subsystem modules or processes 17(1)-17(n) used to connect to the desired process rules executor. The INS gateway is one of the subsystem modules or processes 17(1)-17(n) that manages the historical profile of executed subsystem processes by enabling transaction query, SLA Management, process and business analytics. The WB gateway is one of the subsystem modules or processes 17(1)-17(n) that provides the needed interface mechanism to connect to distributed work bench locations. The Process Rules Executor is one of the subsystem modules or processes 17(1)-17(n) that is responsible for execution of business rules which are defined by the PC subsystem module or process. The Process Rules Executor is invoked through the PR gateway subsystem process. The Message Bus is one of the subsystem modules or processes 17(1)-17(n) that provides the infrastructure for various subsystem processes in the environment to communicate to each other. The Monitor module or process is one of the subsystem modules or processes 17(1)-17(n) that provides user with the monitoring capabilities of the entire business process at each subsystem module or process level. The Monitor module or process obtains metrics comprising information or other data from the agents 16(1)-16(n) which are running on the server devices 14(1)-14(n). The obtained metrics comprising the information or other data can be transformed and stored by the application management computing device 12 or another device for future use, such as for knowledge management activities or data analysis by way of example only. The obtained metrics comprising the information or other data also can be used by the application management computing device 12 or another device to generate more user friendly reports, such as graphs or texts by way of example only. The Automatic Application Manager is one of the subsystem modules or processes 17(1)-17(n) that has the provisioning for all the hardware and software requirements of the subsystem modules or processes 17(1)-17(n).

Each of the subsystem modules or processes 17(1)-17(n) has its own one of the error recovery modules (ER) 19(1)-19(n). Each one of the error recovery modules (ER) 19(1)-19(n) is responsible for executing the correct set of stored programmed instructions based on the error condition identified by the corresponding one of the agents 16(1)-16(n) on one of the subsystem modules or processes 17(1)-17(n). Each one of the error recovery modules (ER) 19(1)-19(n) also receives and stores information and other data related to the execution of the one of the subsystem modules or processes 17(1)-17(n) in the memory of the corresponding one of the servers 14(1)-14(n) for use during error recovery.

Although examples of the application management computing device 12 and servers 14(1)-14(n) are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
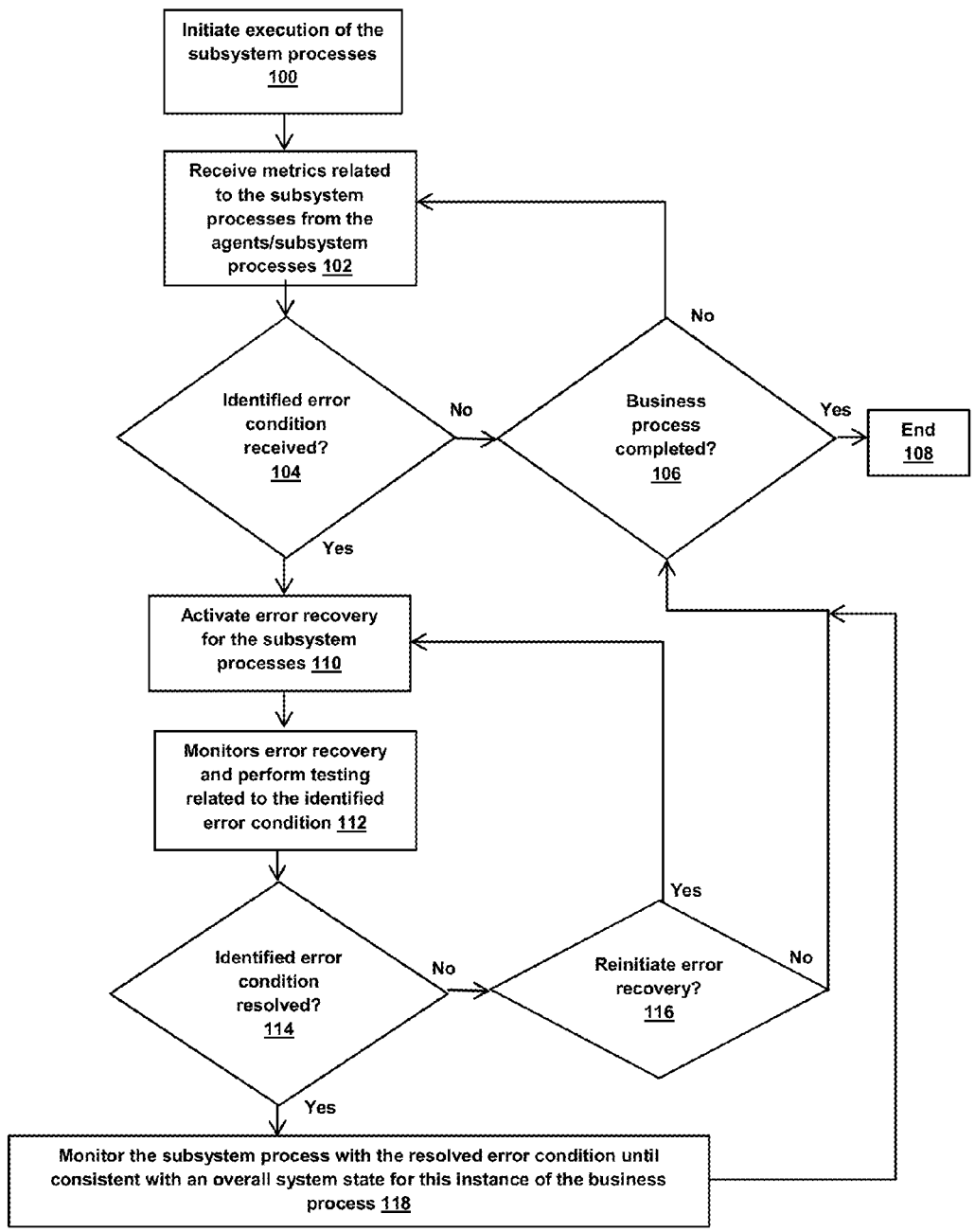
FIG. 3 is a flow chart of a method for implementing error detection and recovery for a business process operating in a cloud based architecture.

An example of a method for implementing error detection and recovery for a business process operating in a cloud based architecture will now be described with reference to FIGS. 1-3, although this technology can be used with other types of architectures. Referring more specifically to FIG. 3, in step 100 the application management computing device 12 may initiate activation and execution of one or more programmed instructions for one or more of instances of the subsystem modules or processes 17(1)-17(n) of an instance of a business process.

In step 102, the application management computing device 12 receives from the agents 16(1)-16(n) in the server devices 14(1)-14(n) which are monitoring the execution of the one or more subsystem modules or processes 17(1)-17(n) for the business process, one or more metrics comprising information or other data related to the execution of the one or more subsystem modules or processes 17(1)-17(n), although the metrics can be obtained in other manners.

In step 104, the application management computing device 12 determines when notification of an identified error condition in one of the subsystem modules or processes 17(1)-17(n) has been received. In this particular example, the application management computing device 12 is notified by the agents 16(1)-16(n) whenever an error condition or other abnormality is identified in any of the one or more subsystem modules or processes 17(1)-17(n), although other approaches for determining when an error condition has occurred could be used. When one of the agents 16(1)-16(n) identifies an error condition in the executing path of one of the subsystem modules or processes 17(1)-17(n), the one of the agents 16(1)-16(n) will also provide the monitored information or other data necessary for the corresponding one of the error recovery (ER) modules or processes 19(1)-19(n) to execute the set of instructions for error recovery. If in step 104 the application management computing device 12 determines no notification of an identified error condition has been received, then the No branch is taken to step 106

In step 106, the application management computing device 12 determines whether a life cycle of this instance of the business process is completed. If the application management computing device 12 determines this life cycle of the business process is not completed, then the No branch is taken back to step 102 as described earlier. If the application management computing device 12 determines this life cycle of the business process is completed, then the Yes branch is taken to step 108 where this example of the method ends.

If back in step 104 the application management computing device 12 determines notification of an identified error condition has been received, then the Yes branch is taken to step 110. In step 110, the application management computing device 12 initiates activation and execution of the corresponding one of the error recovery (ER) modules or processes 19(1)-19(*n*) appropriate for the identified error condition via the corresponding one of the agents 16(1)- 16(*n*). The corresponding one of the error recovery (ER) modules or processes 19(1)-19(*n*) for the identified error condition has the necessary programmed instructions to rectify the identified error condition and during this error recovery may use any other necessary monitored data obtained back in step 102.

In step 112, the application management computing device 12 monitors the error recovery and performs testing related to the identified error condition in the one of the one or more subsystem modules or processes 17(1)-17(*n*) with the identified error condition. Additionally, the application management computing device 12 logs details on the identified error condition and performance of the error recovery which may be persisted to the memory 22, although the details can be stored in other locations. Additionally, these details may be used for other purposes, such as by the Monitor module or process to show the status of the business process on the display device 28 by way of example only, although the information can be displayed and/or used in other manners. In another example, these details on identified error conditions which occurred during execution of this instance of the business process can be used by the application management computing device 12 to automatically scale up or scale down the number of the error recovery (ER) modules or processes 19(1)-19(*n*) associated with each of the one or more subsystem modules or processes 17(1)- 17(*n*).

In step 114, the application management computing device 12 determines whether the identified error condition in one of the one or more subsystem modules or processes 17(1)-17(*n*) has been resolved. If in step 114, application management computing device 12 determines the identified error condition has not been resolved, then the No branch is taken to step 116.

In step 116, the application management computing device 12 determines whether to reinitiate error recovery for the identified error condition in the one of the one or more subsystem modules or processes 17(1)-17(*n*). If in step 116 the application management computing device 12 determines to reinitiate error recovery, then the Yes branch is taken back to step 110. When reinitiating error recovery for an identified error condition in one of the one or more subsystem modules or processes 17(1)-17(*n*) which was not previously resolved in step 110, the application management computing device 12 may try to resolve the identified error condition using the same error recovery or could try other approaches, such as identifying and initiating execution of an alternative set of programmed instructions for error recovery. By way of example only, if the one of the one or more subsystem modules or processes 17(1)-17(*n*) with the identified error condition was an e-mail sending mechanism which failed due to network related errors, the application management computing device 12 might initiate error recovery comprising an email re-sending process after a set time period until the identified error condition is completely resolved by the successful transmission of the email. If in step 116 the application management computing device 12 determines not to reinitiate error recovery, then the No branch is taken to step 106 as described above.

If back in step 114, application management computing device 12 determines the identified error condition has been resolved, then the Yes branch is taken to step 118. In step 118, the application management computing device 12 monitors the one of the one or more subsystem modules or processes 17(1)-17(*n*) with the resolved error condition until it is consistent with an overall system state for this instance of the business process and then proceeds to step 106 described earlier.

Accordingly as illustrated and described herein this technology provides methods, devices, and non-transitory computer readable media that efficiently and effectively implement error detection and recovery automatically for a business process operating in a cloud based architecture. With this technology, the time period for recovering and reinitiating a subsystem module or process is substantially reduced. Additionally, with this technology other subsystems processes are able to continue execution during the error recovery process. Further, this technology is able to obtain and provide metrics about instances of the subsystem modules or processes during the life cycle of a business process and can make automatic adjustments related to error recovery.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for implementing error detection and recovery, the method comprising:

receiving, by an application management computing device, from one or more agents monitoring one or more subsystem processes of a business process operating in a cloud based architecture, i) an identification of an error condition in at least one of the one or more subsystem processes, and ii) any associated information or data necessary to execute the at least one of the one or more subsystem processes with the identified error condition;

executing, by the application management computing device, an error recovery process for the at least one of the one or more subsystem processes with the identified error condition;

logging, by the application management computing device, details on performance of the error recovery process in a memory;

automatically modifying, by the application management computing device, a number of error recovery processes for the at least one of the one or more subsystem processes with the identified error condition based on performance of the error recovery process and details associated with the identified error condition; and reinitiating, by the application management computing device, the recovered at least one of the one or more subsystem processes with the identified error condition using the received information or data corresponding to the at least one of the subsystem processes with the identified error condition.

2. The method of claim 1 further comprising receiving, by the application management computing device, from the one or more agents, one or more metrics of the at least one of the one or more subsystem processes.

3. The method of claim 2 wherein the one or more metrics further comprise at least one of a status of one or more processing activities, a measurement of utilization of one or more resources, or a measurement of performance of one or more aspects.

4. The method of claim 2 further comprising storing, by the application management computing device, the one or more metrics.

5. The method of claim 2 further comprising generating, by the application management computing device, at least one report based on at least one of the identified error condition or the one or more metrics.

6. The method of claim 1 further comprising allowing, by the application management computing device, one of the one or more subsystem processes to continue execution during the executing a corresponding error recovery process and the reinitiating the recovered at least one of the one or more subsystem processes with the identified error condition.

7. An application management computing device, comprising:
   a processor coupled to a memory and configured to be capable of executing programmed instructions stored in the memory, comprising:
      receiving from one or more agents monitoring one or more subsystem processes of a business process operating in a cloud based architecture, i) an identification of an error condition in at least one of the one or more subsystem processes, and ii) any associated information or data necessary to execute the at least one of the one or more subsystem processes with the identified error condition;
      executing an error recovery process for the at least one of one or more the subsystem processes with the identified error condition;
      logging details on performance of the error recovery process in a memory;
      automatically modifying a number of error recovery processes for the at least one of the one or more subsystem processes with the identified error condition based on performance of the error recovery process and details associated with the identified error condition; and
      reinitiating the recovered at least one of the one or more subsystem processes with the identified error condition using the received information or data corresponding to the at least one of the subsystem processes with the identified error condition.

8. The device of claim 7 further comprising receiving from the one or more agents, one or more metrics of the at least one of the one or more subsystem processes.

9. The device of claim 8 wherein the one or more metrics further comprise at least one of a status of one or more processing activities, a measurement of utilization of one or more resources, or a measurement of performance of one or more aspects.

10. The device of claim 8 further comprising storing the one or more metrics.

11. The device of claim 8 further comprising generating at least one report based on at least one of the identified error condition or the one or more metrics.

12. The device of claim 7 further comprising allowing one of the one or more subsystem processes to continue execution during the executing a corresponding error recovery process and the reinitiating the recovered at least one of the one or more subsystem processes with the identified error condition.

13. A non-transitory computer readable medium having stored thereon instructions for implementing error detection and recovery comprising machine executable code which when executed by a processor, causes the processor to perform steps comprising:
   receiving from one or more agents monitoring one or more subsystem processes of a business process operating in a cloud based architecture, i) an identification of an error condition in at least one of the one or more subsystem processes, and ii any associated information or data necessary to execute the at least one of the one or more subsystem processes with the identified error condition;
   executing an error recovery process for the at least one of one or more the subsystem processes with the identified error condition;
   logging details on performance of the error recovery process in a memory;
   automatically modifying a number of error recovery processes for the at least one of the one or more subsystem processes with the identified error condition based on performance of the error recovery process and details associated with the identified error condition; and
   reinitiating the recovered at least one of the one or more subsystem processes with the identified error condition using the received information or data corresponding to the at least one of the subsystem processes with the identified error condition.

14. The medium of claim 13 further comprising receiving from the one or more agents, one or more metrics of the at least one of the one or more subsystem processes.

15. The medium of claim 14 wherein the one or more metrics further comprise at least one of a status of one or more processing activities, a measurement of utilization of one or more resources, or a measurement of performance of one or more aspects.

16. The medium of claim 14 further comprising storing the one or more metrics.

17. The medium of claim 14 further comprising generating at least one report based on at least one of the identified error condition or the one or more metrics.

18. The medium of claim 13 further comprising allowing one of the one or more processes to continue execution during the executing a corresponding error recovery process and the reinitiating the recovered at least one of the one or more subsystem processes with the identified error condition.

* * * * *